THOMAS E. DODD
JOHN J. LAKOVITS
THOMAS M. JULOW
INVENTORS

BY
William P. Hickey
ATTORNEY

April 13, 1965     T. E. DODD ETAL     3,178,191
SEALING STRUCTURE

Filed Feb. 6, 1964     2 Sheets-Sheet 2

THOMAS E. DODD
JOHN J. LAKOVITS
THOMAS M. JULOW
          INVENTORS

BY Richard G. Geib
          ATTORNEY

United States Patent Office

3,178,191
Patented Apr. 13, 1965

3,178,191
SEALING STRUCTURE
Thomas E. Dodd, John J. Lakovits, and Thomas M. Julow, South Bend, Ind., assignors to The Bendix Corporation, South Bend, Ind., a corporation of Delaware
Filed Feb. 6, 1964, Ser. No. 343,071
3 Claims. (Cl. 277—138)

The present invention relates to seals for reciprocating members; and more particularly to vacuum seals which must accommodate some lateral movement of the reciprocating member. This is a continuation-in-part of my copending application Serial No. 88,532 filed February 10, 1961, and now abandoned.

An object of the present invention is the provision of a new and improved sealing structure which can be pressed into a receiving recess which surrounds a reciprocating member to provide both a seal with respect to the reciprocating member and to the sidewalls of the recess of the housing member.

A further object of the present invention is the provision of a new and improved sealing structure of the above mentioned type which can be used to close off and bridge openings of large diameter relative to the reciprocating structure.

Figure 1:
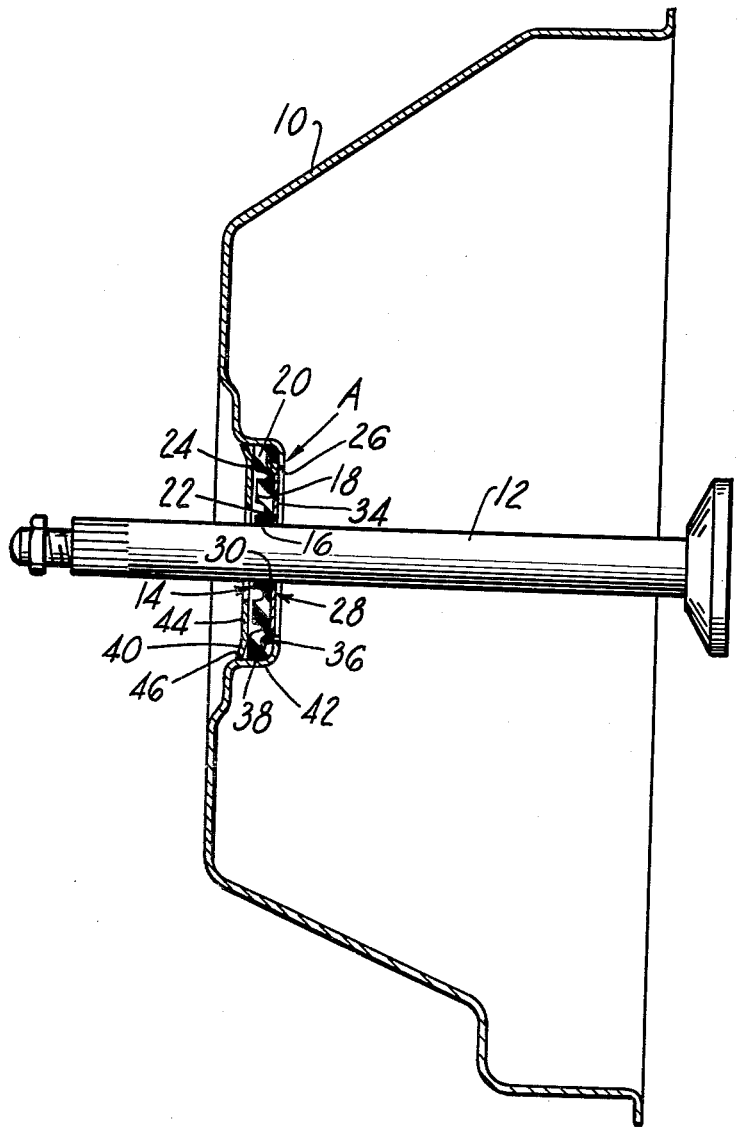
Figure 2:
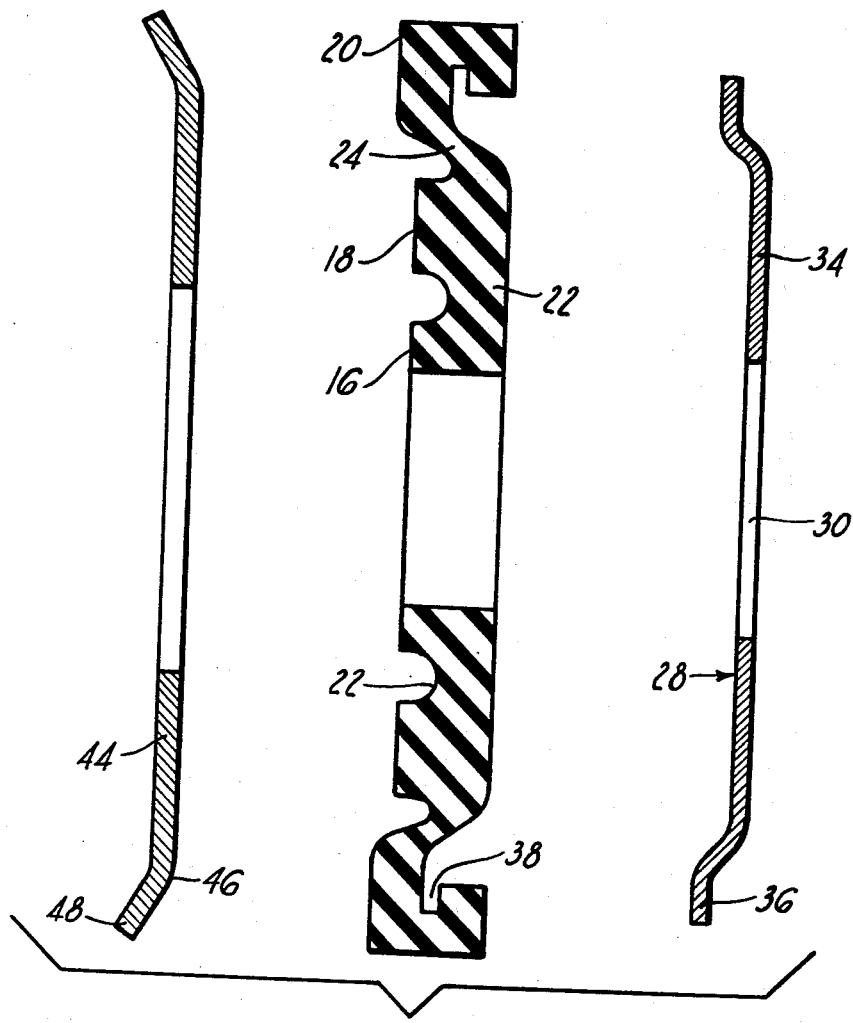

The invention resides in certain constructions and combinations and arrangements of parts; and further objects and advantages of the invention will become apparent to those skilled in the art to which it relates from the following description of the preferred embodiment described with reference to the accompanying drawings forming a part of this specification, and in which:

FIGURE 1 is a cross sectional view of one end housing of a servomotor having a reciprocable rod extending therethrough, and which incorporates a seal constructed in accordance with the principles of the present invention; and FIGURE 2 is a telescopic view of the parts which form the seal relative to the rod and housing when pressed into position.

While the invention may be otherwise embodied, it is herein shown and described as being used in the end closure member 10 of the servomotor shown and described in the Oswald O. Kytta Patent No. 3,096,689 filed January 30, 1961.

It will be noted by referring to the above identified application, that the reciprocating rod 12 with which the sealing structure A forms a sliding seal, extends between the power driven element of a servomotor, and the hydraulic piston of a master cylinder that is bolted to the closure plate 10 of the servomotor. The master cylinder is fastened to the servomotor using mass production methods, and a certain amount of misalignment occurs between the two; so that lateral motion is imparted to the reciprocating rod 12 during its movement through the seal. It will further be noted that vacuum exists on the inside of the closure plate 10, while atmospheric pressure exists on the outside of the cover plate 10, so that the sealing structure A is required to maintain a vacuum tight seal at all times. As is well known in the art, a tight vacuum seal with respect to reciprocating structures is difficult to maintain; and the lateral movement above referred to makes this sealing problem even more difficult.

The sealing structure A shown in the drawing generally comprises an annular sealing disc 14 having radially disposed inner, intermediate and outer concentric ring portions 16, 18 and 20, respectively. The annular sealing disc 14 may be made of any suitable resilient elastomeric material, and as shown in the drawing, is made of neoprene rubber. According to principles of the present invention, the radially inner and intermediate rings 16 and 18 respectively, are connected by flexible but fairly stiff radially extending web portion 22 positioned adjacent the inner face of the disc, and the intermediate and outer ring sections 18 and 20 respectively are connected by a more flexible web portion 24 which extends transversely between opposite faces of the disc. In some instances the flexible web portion 24 may be attached to the intermediate ring portion 18 adjacent the opposite side of the disc 14 from the radially extending web portion 22; but in the preferred embodiment shown in the drawing is attached to the intermediate ring 18 on the side of the disc on which web 22 is positioned and is attached to the radial outer ring 20 adjacent the opposite side of the disc.

In some instances it will be possible for the surfaces of the housing member (in this case the cover plate 10) to be formed with a close fit with respect to the reciprocating rod 12, so as to provide adequate backing or support for the annular sealing disc 14. In the application shown in the drawing, however, it is desired that the opening 26 through which the rod 12 passes be made considerably larger than the rod 12, so that a headed portion on the rod can be withdrawn through the opening 26. In the preferred embodiment of the sealing structure A shown in the drawing, an annular back-up washer or disc 28 is provided to support the flexible sealing disc 14. The annular back-up washer 28 has a central opening 30 just sufficiently large enough to tolerate the lateral movement of the rod 12, and has a radially inner or center section 34 which lays up against and supports the radially inner ring 16, web 22 and intermediate ring 18. The radially outer portion 36 of the back-up washer 28 is offset into the space between the intermediate and outer rings, 18 and 20 respectively, and has its outer periphery received in a recess 38 formed in the inner surface of the radially outer ring 20. Back-up washer 28 therefore serves the dual purpose of supporting the inner end surface of the sealing disc 14, and provides radial support for the outer ring 20 such that the outer ring section 20 is radially compressed between washer 28 and a cylindrical surface 40 formed in the end closure plate 10 about the opening 26. Thus, the outer ring section 20 is in a gripping, sealing engagement with the surface 40.

In the embodiment shown in the drawing, the cylindrical surface 40 is formed by a recess that is stamped into the external surface of the closure plate, so as to form both the cylindrical surface 40 and shoulder 42 against which the sealing disc 14 is positioned. The rubber sealing disc 14 is assembled onto the periphery of the annular back-up washer 28 and the composite structure is pressed into the recess forming the cylindrical surface 40 and shoulder 42. The outer section 20 has been dimensioned between .007 and .023 oversized as compared with surface 40.

If necessary, a retaining washer 44 may be pressed against the outer ring 20 to aid in axially locating the sealing structure "A." The washer 44 is retained in position by an interference fit with respect to the cylindrical surfaces 40. The periphery of the retaining washer 44 is preferably made yieldable as by a radially outwardly turning flange 46. Flange 46 is preferably notched at its outer periphery to provide flexible fingers 48 which abut the cylindrical surface 40 without deforming the center portion of the retaining washer.

The radially inner ring portion 16 of the sealing disc 14 is shaped to form a flexible lip which has a slight interference fit with respect to the rod to insure that it at all times contacts the rod without providing an appreciable frictional force. The intermediate ring portion 18 and web portion 22 serves the purpose of stiffening the inner or heel portion of the radially inner ring 16, and thereby provide adequate support for the sealing lip of the inner ring 16. During sliding movement of the rod 12 through the seal, there will sometimes occur an axial movement of the sealing structure; and it is the purpose of the intermediate ring 18 to abut the retaining washer 44 and thereby hold the heel of the inner ring 16 into a position where sealing of the lip of the inner ring 16 is assured. In order to adequately support the inner ring 16, the web portion 22 must be relatively stiff; and in order to accommodate lateral movement of the seal, the radially outer web 24 must be flexible to absorb the lateral movement of the rod 12 without appreciably distorting the web 22 or inner ring 16.

In some instances, the portion of the outer ring that is squeezed between the periphery of the back-up washer 28 and cylindrical surface 40 will produce most or all of the sealing action with respect to the housing or closure plate 10. As a further refinement of the embodiment shown in the drawing, the portion of the seal of the outer ring 20 that is positioned between the shoulder 42 and the back-up washer 28 is forced into tight sealing engagement, when the retaining washer 44 is pressed into position; so that it too will produce a tight sealing engagement with respect to the shoulder 42. In some instances, the retaining washer 44 may not be necessary if other structure is provided on which the intermediate ring 18 may abut to prevent the seal from being removed from the cylindrical recess surrounding the opening 26. It will further be seen that the sealing structure A could be used to provide a seal which will withstand above atmospheric pressures within the housing member by turning the sealing structure around. In such instances sealing structure A need only form an interference fit with respect to a cylindrical surface surrounding the shaft and some suitable abutment means provided for preventing the sealing structure from being blown out of the cylindrical opening.

It will be apparent that the objects heretofore enumerated as well as others have been accomplished; and that there has been provided a sealing structure which can be pressed into a cylindrical opening surround a reciprocating shaft to effect both a seal with respect to the sidewalls of said opening and the shaft, and which will accommodate some lateral movement.

While the invention has been described in considerable detail, I do not wish to be limited to the particular construction shown and described; and it is my intention to cover hereby all novel adaptations, modifications and arrangements thereof which come within the practice of those skilled in the art to which the invention relates.

We claim:
1. A structure for effecting a sliding seal and a stationary seal for an opening in a housing and for a rod adapted to reciprocate within said opening, said seal comprising:
(1) a disc of resilient sealing material including,
  (a) an inner ring portion whose central opening dimension is equal to said rod's outer dimension,
  (b) an intermediate ring portion concentric with said inner ring portion,
  (c) an outer ring portion concentric with said inner and intermediate rings, said outer ring having a peripheral dimension greater than said opening through said housing, said outer ring portion having a recess formed in an inner surface and extending radially inwardly from the ring's inner surface,
  (d) a flexible web diagonally connecting said outer and intermediate ring portions,
  (e) a rigid vertical web of short length connecting said inner and intermediate ring portions such that said inner and intermediate ring portions are immobile with respect to each other; and
(2) an annual retainer disc having a radial outer portion of substantially equal cross sectional dimension as said recess, which radial outer portion projects into said recess of said outer ring to radially locate said outer ring portion for a press fit in said opening.

2. A seal for a rod that projects through an opening in a recessed portion of a housing member, which seal comprises:
(1) a disc of resilient sealing material including,
  (a) an inner ring portion whose central opening dimension is equal to said rod's outer dimension,
  (b) an intermediate ring portion, concentric with said inner ring portion,
  (c) an outer ring portion concentric with said inner and intermediate ring portions, said outer ring cross section being of a greater free dimension than an annular sidewall of said recessed portion, said outer ring portion having a recess formed in an inner surface and extending radially inwardly from said ring's innermost surface,
  (d) a flexible web diagonally connecting one face of said intermediate ring to the other face of said outer ring,
  (e) a short rigid web vertically extending to connect similar faces of said intermediate and inner rings immobilizing said intermediate and inner rings;
(2) an annular retainer means having a radial outer portion of substantially equal diameter as said recess portion about said opening, said outer portion being inserted in said recessed portion of said outer ring to radially position said outer ring so that said disc will have an interference fit with said annular wall.

3. A seal according to claim 2 and comprising a retaining washer of greater diameter than said annular wall of said housing's recessed portion, said washer having yieldable peripheral portions which are arranged to grip the annular wall of the recessed portion to hold said disc against said retainer disc and, in turn, against an end wall of said recessed portion.

References Cited by the Examiner
UNITED STATES PATENTS

| | | | |
|---|---|---|---|
| 1,961,438 | 6/34 | Winter | 277—174 |
| 2,477,882 | 8/49 | La Brie | 277—212 |
| 2,631,906 | 3/53 | Brock | 277—152 |
| 2,864,632 | 12/58 | Hupp | 277—188 |
| 2,993,712 | 7/61 | Hocker | 277—166 X |

EDWARD V. BENHAM, *Primary Examiner.*